US011858100B2

(12) United States Patent
Kendall et al.

(10) Patent No.: US 11,858,100 B2
(45) Date of Patent: Jan. 2, 2024

(54) IMPACT POWER TOOL

(71) Applicant: MILWAUKEE ELECTRIC TOOL CORPORATION, Brookfield, WI (US)

(72) Inventors: Bryan C. Kendall, Brookfield, WI (US); Taylor Crabb, Brookfield, WI (US); Nicholas E. Holstine, Wauwatosa, WI (US); Zachary J. Evans, Waukesha, WI (US); Jacob R. Schaddel, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/715,692

(22) Filed: Apr. 7, 2022

(65) Prior Publication Data

US 2022/0324090 A1 Oct. 13, 2022

Related U.S. Application Data

(60) Provisional application No. 63/171,905, filed on Apr. 7, 2021.

(51) Int. Cl.

*B25D 11/12* (2006.01)
*B25D 16/00* (2006.01)
*B25D 17/04* (2006.01)

(52) U.S. Cl.

CPC ............ *B25D 11/12* (2013.01); *B25D 16/006* (2013.01); *B25D 17/04* (2013.01); (Continued)

(58) Field of Classification Search

CPC ...... B25D 11/12; B25D 16/006; B25D 17/04; B25D 2211/068; B25D 2250/375

See application file for complete search history.

(56) References Cited

U.S. PATENT DOCUMENTS 3,430,709 A 3/1969 Miller
3,685,594 A 8/1972 Koehler
(Continued)

FOREIGN PATENT DOCUMENTS

CN 103056845 B 5/2015
CN 103538035 B 11/2017
(Continued)

OTHER PUBLICATIONS

Canadian Centre for Occupational Health & Safety; "Hand Tool Ergonomics—Tool Design"; Jan. 2, 2018; website: https://www.ccohs.ca/oshanswers/ergonomics/handtools/tooldesign.html (Year: 2018).*

(Continued)

*Primary Examiner* — Thomas M Wittenschlaeger
*Assistant Examiner* — David G Shutty
(74) *Attorney, Agent, or Firm* — Michael Best & Friedrich LLP

(57) ABSTRACT

An impact power tool including a housing, a motor supported by the housing, a spindle coupled to the motor for receiving torque from the motor to cause the spindle to rotate, and a reciprocating impact mechanism operable to create a variable pressure air spring within the spindle. The impact mechanism includes a striker received within the spindle that reciprocates along a reciprocation axis in response to the variable pressure air spring, a piston that reciprocates along the reciprocation axis to induce the variable pressure air spring, and a crankshaft configured to convert continuous rotational motion from the motor to reciprocating linear movement of the piston. The crankshaft defines a crank axis perpendicular to the reciprocation axis, and the motor defines a motor axis that is parallel with the reciprocation axis. A center of gravity of the impact power (Continued)

tool is positioned between the motor axis and the reciprocation axis.

18 Claims, 4 Drawing Sheets

(52) U.S. Cl.
CPC .................... *B25D 2211/068* (2013.01); *B25D 2216/0084* (2013.01); *B25D 2250/375* (2013.01)

(56) References Cited

U.S. PATENT DOCUMENTS

| | | | | | |
|---|---|---|---|---|---|
| 3,896,888 | A * | 7/1975 | Badcock | B25D 16/006 | 74/606 R |
| 4,192,391 | A * | 3/1980 | Kastreuz | B25D 17/06 | 92/85 R |
| 4,529,044 | A * | 7/1985 | Klueber | B25D 16/00 | 408/9 |
| 4,770,254 | A | 9/1988 | Kominami | | |
| 6,712,156 | B2 * | 3/2004 | Funfer | B25D 16/006 | 173/104 |
| 6,843,330 | B2 | 1/2005 | Schmid et al. | | |
| 7,322,427 | B2 * | 1/2008 | Shimma | B25D 16/006 | 173/217 |
| 7,331,496 | B2 * | 2/2008 | Britz | B25D 16/006 | 74/22 A |
| 7,568,529 | B2 | 8/2009 | Nonaka et al. | | |
| 8,292,002 | B2 | 10/2012 | Baumann et al. | | |
| 8,464,805 | B2 | 6/2013 | Baumann et al. | | |
| 8,820,433 | B2 | 9/2014 | Kuehne et al. | | |
| 9,010,456 | B2 * | 4/2015 | Sieber | B25D 16/006 | 173/48 |
| 9,339,923 | B2 * | 5/2016 | Aoki | B25D 16/003 | |
| 9,434,062 | B2 | 9/2016 | Kamegai | | |
| 9,724,814 | B2 | 8/2017 | Yoshikane et al. | | |
| 9,808,925 | B2 * | 11/2017 | Yamada | B25D 11/00 | |
| 9,815,185 | B2 | 11/2017 | Machida | | |
| 9,962,823 | B2 | 5/2018 | Machida | | |
| 10,179,400 | B2 | 1/2019 | Furusawa et al. | | |
| 10,259,111 | B2 | 4/2019 | Herr et al. | | |
| 10,328,558 | B2 * | 6/2019 | Rompel | B25B 21/026 | |
| 10,414,035 | B2 | 9/2019 | Ohlendorf | | |
| 10,500,706 | B2 | 12/2019 | Takeuchi et al. | | |
| 10,518,399 | B2 | 12/2019 | Lv | | |
| 10,843,321 | B2 | 11/2020 | Mori et al. | | |
| 2009/0308626 | A1 | 12/2009 | Saur | | |
| 2011/0017483 | A1 * | 1/2011 | Baumann | B25D 17/24 | 173/162.2 |
| 2013/0028674 | A1 * | 1/2013 | Okubo | B25D 16/006 | 408/16 |
| 2015/0041170 | A1 * | 2/2015 | Yoshikane | B25D 11/06 | 173/104 |
| 2015/0158166 | A1 * | 6/2015 | Schlesak | B25D 11/005 | 173/112 |
| 2015/0367490 | A1 * | 12/2015 | Satou | B25D 16/006 | 173/48 |
| 2016/0107303 | A1 * | 4/2016 | Roberts | B25D 16/006 | 173/104 |
| 2016/0129578 | A1 * | 5/2016 | Sprenger | B25F 5/001 | 173/1 |
| 2016/0250743 | A1 | 9/2016 | Kikuchi et al. | | |
| 2021/0114193 | A1 | 4/2021 | Yoshikane et al. | | |
| 2021/0114194 | A1 | 4/2021 | Machida et al. | | |
| 2021/0114195 | A1 | 4/2021 | Yoshikane et al. | | |
| 2022/0324090 | A1 * | 10/2022 | Kendall | B25D 16/006 | |

FOREIGN PATENT DOCUMENTS

| | | | | |
|---|---|---|---|---|
| CN | 103538037 | B | 6/2019 | |
| DE | 3039631 | A1 | 5/1982 | |
| DE | 3405922 | C2 | 9/1993 | |
| EP | 0560512 | B1 | 12/1997 | |
| EP | 1281483 | A2 * | 2/2003 | B25D 11/12 |
| EP | 1281483 | B1 | 4/2008 | |
| EP | 2103388 | B1 | 4/2011 | |
| WO | 9112116 | A1 | 8/1991 | |
| WO | 2009049954 | A1 | 4/2009 | |
| WO | 2009083307 | A1 | 7/2009 | |
| WO | 2012024842 | A1 | 3/2012 | |
| WO | 2012084349 | A1 | 6/2012 | |
| WO | 2013140793 | A1 | 9/2013 | |

OTHER PUBLICATIONS

International Search Report and Written Opinion for Application No. PCT/US2022/023884 dated Jul. 27, 2022 (10 pages).

* cited by examiner

IMPACT POWER TOOL

CROSS REFERENCE TO RELATED APPLICATION

This application claims the benefit of U.S. Provisional Patent Application No. 63/171,905 filed on Apr. 7, 2021, the entire content of which is incorporated herein by reference.

FIELD OF THE INVENTION

The present disclosure relates to power tools, and more particularly to impact power tools.

BACKGROUND OF THE INVENTION

Impact power tools such as breakers and rotary hammers impart axial impacts to a tool bit while performing a drilling or breaking operation on a work surface. Rotary hammers additionally impart rotation to a tool bit while performing a drilling or breaking operation. Generally, rotary hammers include an impact mechanism to impart the axial impacts and a transmission to convert the rotation from a motor to a reciprocating motion that imparts the axial impacts. Rotary hammers typically include wobble assemblies to transfer the rotation from the motor to the impact mechanism. However, wobble assemblies generate a high amount of vibration.

SUMMARY OF THE INVENTION

The present invention provides, in one aspect, an impact power tool adapted to impart axial impacts to a tool bit. The impact power tool includes a housing, a motor supported by the housing, a spindle coupled to the motor for receiving torque from the motor to cause the spindle to rotate, and a reciprocating impact mechanism that is operable to create a variable pressure air spring within the spindle. The impact mechanism includes a striker received within the spindle that reciprocates along a reciprocation axis in response to the variable pressure air spring, a piston that reciprocates along the reciprocation axis to induce the variable pressure air spring, and a crankshaft configured to convert continuous rotational motion from the motor to reciprocating linear movement of the piston. The crankshaft defines a crank axis that is perpendicular to the reciprocation axis, and the motor defines a motor axis that is parallel with the reciprocation axis. A center of gravity of the impact power tool is positioned between the motor axis and the reciprocation axis In another aspect, the impact power tool includes a center of gravity that is positioned between the motor axis and the reciprocation axis.

In another aspect, the impact mechanism further includes a connecting rod connecting the piston to the crankshaft.

In another aspect, the crankshaft includes an eccentric pin to which one end of the connecting rod is pivotably coupled.

The present invention provides, in another aspect, an impact power tool adapted to impart axial impacts to a tool bit. The impact power tool includes a housing and a motor supported by the housing that defines a motor axis. The impact power tool also includes a spindle coupled to the motor for receiving torque from the motor to cause the spindle to rotate and a reciprocating impact mechanism that is operable to create a variable pressure air spring within the spindle. The impact mechanism includes a piston that reciprocates along a reciprocation axis to induce the variable pressure air spring and a crankshaft configured to convert continuous rotational motion from the motor to reciprocating linear movement of the piston. The crankshaft defines a crank axis that is perpendicular to the motor axis. The impact power tool further includes a mode selection member rotatable to switch the operation of the impact power tool between a first mode, in which, the motor is drivably coupled to the piston for reciprocating the piston and rotating the spindle, a second mode, in which, the motor is decoupled form the piston but the spindle is rotated, and a third mode, in which, the motor is drivably coupled to the piston for reciprocating the piston but the spindle does not rotate.

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

Figure 1:
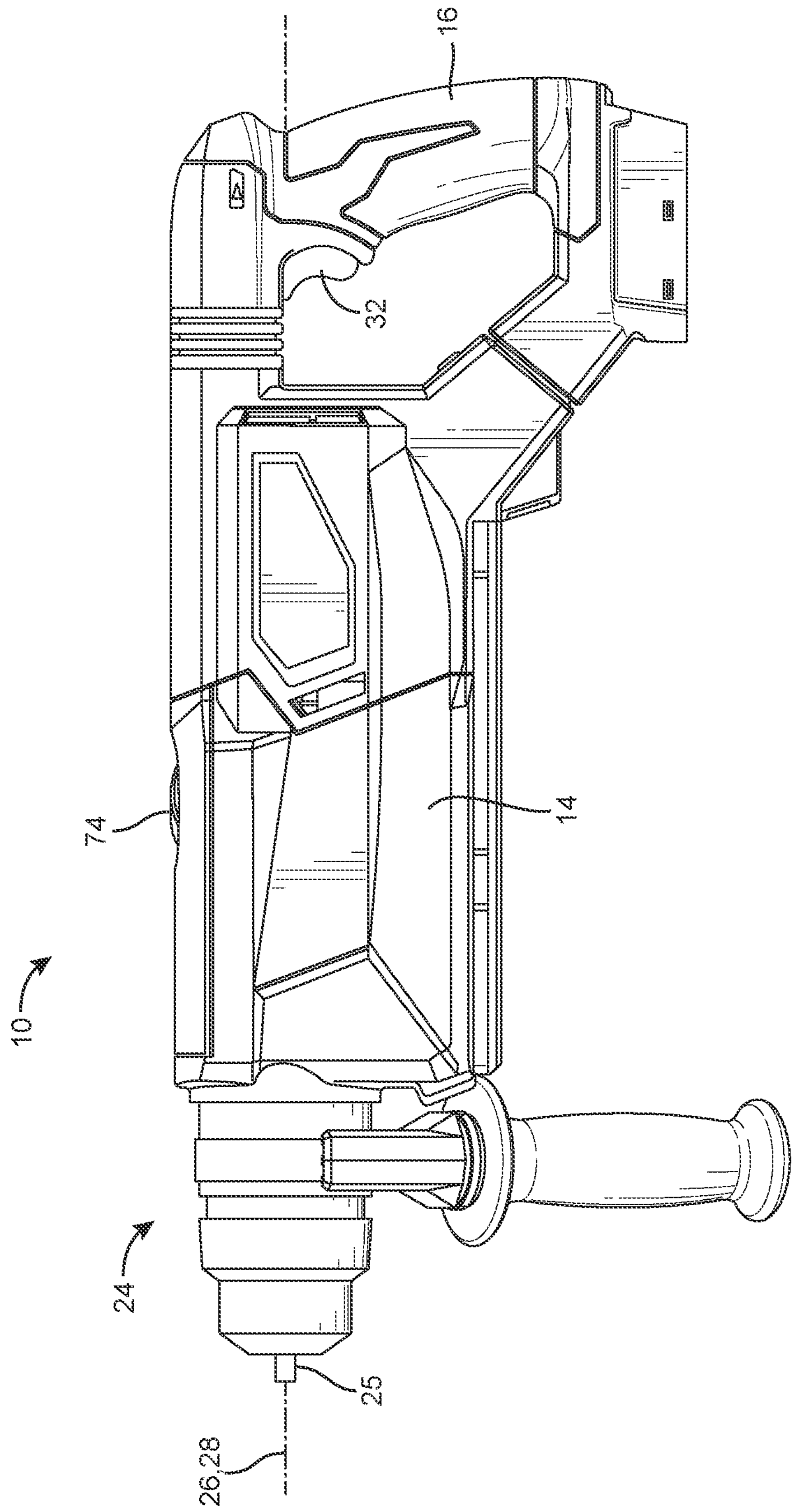
FIG. 1 is a plan view of an impact power tool in accordance with an embodiment of the invention.
Figure 2:
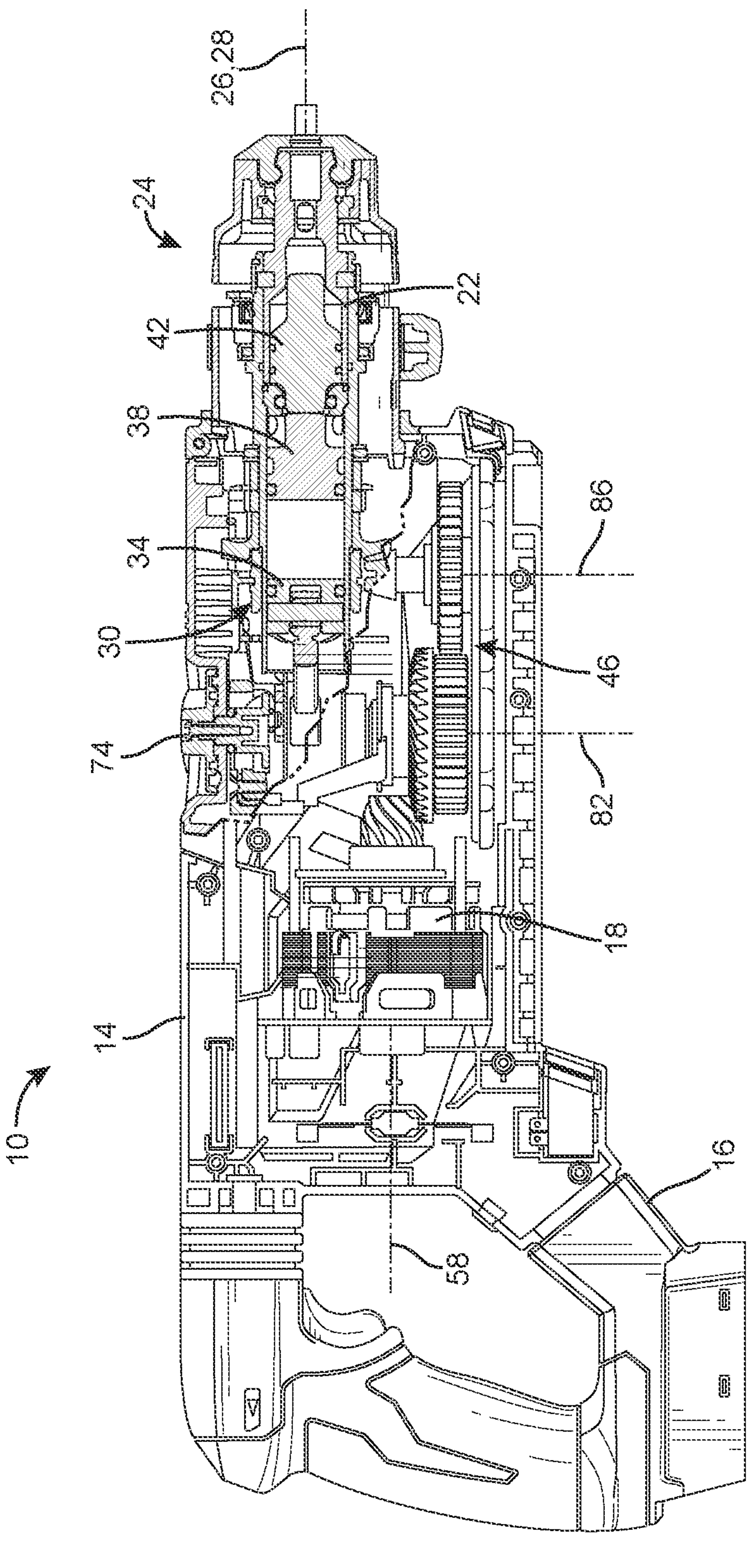
FIG. 2 is a cross-sectional view of the impact power tool of FIG. 1 with portions removed.

FIGS. 1 and 2 illustrate an impact power tool, such as rotary hammer 10, according to an embodiment of the invention. The rotary hammer 10 includes a housing 14 having a D-shaped handle 16, a motor 18 disposed within the housing 14, and a rotatable spindle 22 coupled to the motor 18 for receiving torque from the motor 18. In the illustrated embodiment, the rotary hammer 10 includes a quick-release mechanism 24 coupled for co-rotation with the spindle 22 to facilitate quick removal and replacement of different tool bits. A tool bit 25 may include a necked section or a groove in which a detent member of the quick-release mechanism 24 is received to constrain axial movement of the tool bit 25 to the length of the necked section or groove. The rotary hammer 10 defines a tool bit reciprocation axis 26, which in the illustrated embodiment is coaxial with a rotational axis 28 of the spindle 22.

The motor 18 is configured as a brushless direct current (BLDC) motor that receives power from an on-board power source (e.g., a battery pack, not shown). The battery pack may include any of a number of different nominal voltages (e.g., 12V, 18V, etc.), and may be configured having any of a number of different chemistries (e.g., lithium-ion, nickel-cadmium, etc.). In some embodiments, the battery pack removably coupled to the housing 14. Alternatively, the motor 18 may be powered by a remote power source (e.g., a household electrical outlet) through a power cord. The motor 18 is selectively activated by depressing an actuating member, such as a trigger 32, which in turn actuates an electrical switch for activating the motor 18.

With reference to FIG. 2, the rotary hammer 10 further includes a reciprocating impact mechanism 30 having a reciprocating piston 34 disposed within the spindle 22, a striker 38 that is selectively reciprocable within the spindle 22 in response to a variable pressure air spring developed within the spindle 22 by reciprocation of the piston 34, and an anvil 42 that is impacted by the striker 38 when the striker 38 reciprocates toward the tool bit 25. The impact is then transferred from the anvil 42 to the tool bit 25. Torque from the motor 18 is transferred to the spindle 22 by a transmission 46.

Figure 3:
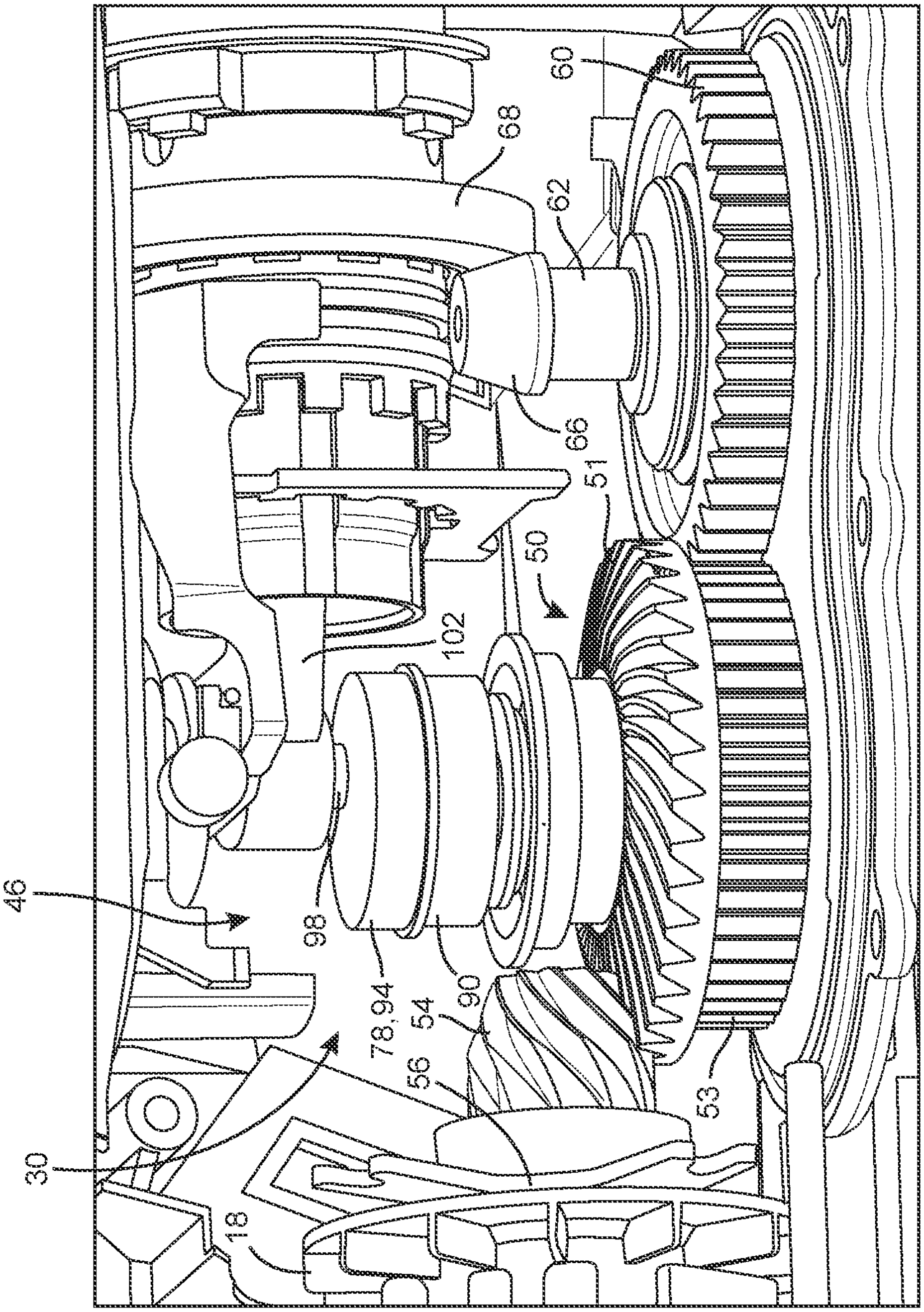
FIG. 3 is an enlarged perspective view of the impact power tool of FIG. 1 with portions removed.
Figure 4:
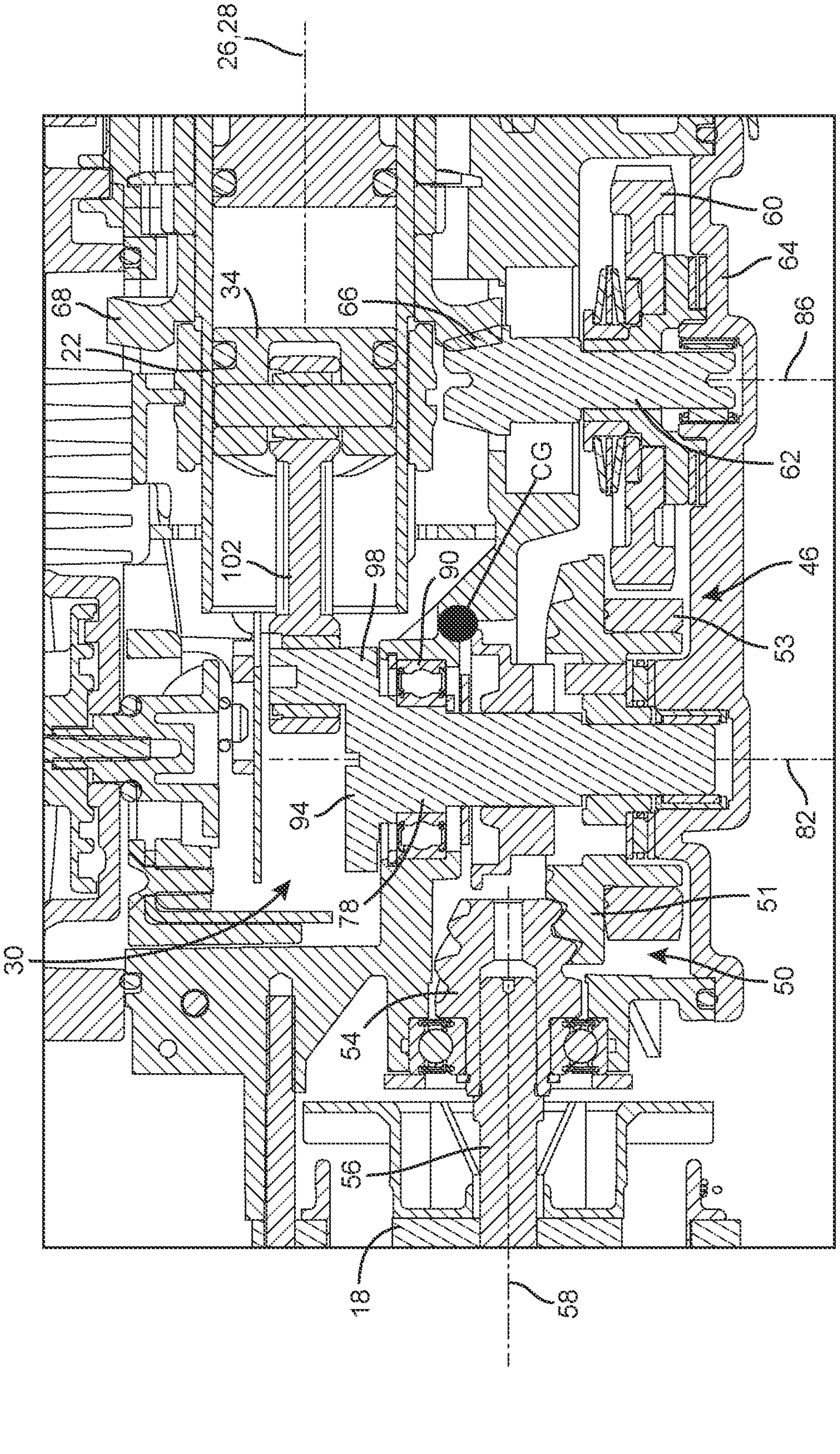
FIG. 4 is a cross-sectional view of a transmission of the impact power tool of FIG. 1.

With reference to FIGS. 3 and 4, the transmission 46 includes an input gear 50 having a bevel gear 51 and a first intermediate gear 53 disposed coaxially with the bevel gear 51 for co-rotation therewith. In some embodiments, the bevel gear 51 and the first intermediate gear 53 may be integral. The bevel gear 51 is engaged with a beveled pinion 54 on an output shaft 56 driven by the motor 18, which defines a motor axis 58 (FIG. 2). The motor axis 58 extends in the same direction as and is offset from the reciprocation axis 26 and the rotational axis 28 of the spindle 22. As such, motor axis 58 is parallel with the reciprocation axis 26 and the rotational axis 28 of the spindle 22. The first intermediate gear 53 is meshed with a second intermediate gear 60 on an intermediate shaft 62 that is supported by a gearcase 64 (FIGS. 2 and 3). The intermediate shaft 62 supports an intermediate pinion 66 that engages an output gear 68 coupled for co-rotation with the spindle 22. The output gear 68 is secured to the spindle 22 using a spline-fit or a key and keyway arrangement, for example, that facilitates axial movement of the spindle 22 relative to the output gear 68 yet prevents relative rotation between the spindle 22 and the output gear 68. In some embodiments, the transmission 46 may include a clutch that may limit the amount of torque transferred from the motor 18 to the spindle 22. In further embodiments, the clutch may disengage the transmission 46 from transferring rotation from the motor 18 to the spindle 22.

With reference back to FIGS. 1 and 2, the rotary hammer 10 includes a mode selection member 74 rotatable by an operator to switch between three modes. In a "hammer-drill" mode, the motor 18 is drivably coupled to the piston 34 for reciprocating the piston 34 while the spindle 22 rotates. In a "drill-only" mode, the piston 34 is decoupled from the motor 18 but the spindle 22 is rotated by the motor 18. In a "hammer-only" mode, the motor 18 is drivably coupled to the piston 34 for reciprocating the piston 34 but the spindle 22 does not rotate.

As shown in FIGS. 3 and 4, the impact mechanism 30 includes a crankshaft 78 that is rotatably supported within the gearcase 64 for co-rotation with the bevel gear 51 and the first intermediate gear 53. In other words, the bevel gear 51 is concentric with the crankshaft 78. The crankshaft 78 defines a crank axis 82 (FIG. 2) that is parallel with a rotational axis 86 of the intermediate shaft 62 and intermediate pinion 66. The crank axis 82 and the rotational axis 86 of the intermediate shaft 62 are perpendicular to the motor axis 58 and both the reciprocating axis and the rotational axis 26, 28 of the spindle 22. A bearing 90 (e.g., a roller bearing, a bushing, etc.) is supported by the gearcase 64 and rotatably supports the crankshaft 78. The crankshaft 78 includes a hub 94 with an eccentric pin 98. In the illustrated embodiment, the hub 94 and the eccentric pin 98 are integrally formed with the crankshaft 78. The impact mechanism 30 further includes a connecting rod 102 (FIG. 3) interconnecting the piston 34 and the eccentric pin 98. In some embodiments, the impact power tool 10 may not include the transmission 46 to transfer rotation from the motor 18 to the spindle 22. In such an embodiment, the impact mechanism 30 would only be operable to impart an axial impact to a tool bit. For example, the impact power tool 10 tool may be a breaker that imparts axial impacts to a large tool bit to break up concrete and other similar workpieces.

Referencing FIGS. 2 and 3, because the motor 18 and the spindle 22 are parallel, the housing 14 is configured with an elongated shape. As such, a majority of the mass of the rotary hammer 10 is located between the motor axis 58 and the axes 26, 28 of the spindle 22. This results in a center of gravity of the rotary hammer 10 (schematically represented as "CG" in FIG. 4) being positioned between the motor axis 58 and the axes 26, 28 of the spindle 22. In some embodiments of the rotary hammer 10, the center of gravity is between 4 mm and 5 mm above the motor axis 58 from the frame of reference of FIG. 4. Having the center of gravity of the rotary hammer 10 between the motor axis 58 and the axes 26, 28 of the spindle 22 locates the force applied by the user on the handle 16, when drilling in an upward direction, generally inline with the center of gravity. Therefore, the moment exerted on the user by the rotary hammer 10 when drilling in an upward direction is decreased, reducing user fatigue when holding the rotary hammer 10 for drilling in an upward direction. In addition, the elongated housing 14 reduces the distance a user must reach in order to perform a drilling operation. Further, providing the impact mechanism 30 with a crankshaft 78 to convert rotary motion from the motor 18 to reciprocating motion of the piston 34, advantageously reduces the amount of vibration caused by the impact mechanism 30 compared to typical rotary hammers that include a wobble assembly.

Various features and advantages are set forth in the following claims.

What is claimed is:

1. An impact power tool adapted to impart axial impacts to a tool bit, the impact power tool comprising:
- a housing;
- a motor supported by the housing;
- a spindle coupled to the motor for receiving torque from the motor to cause the spindle to rotate;
- a reciprocating impact mechanism that is operable to create a variable pressure air spring within the spindle, the impact mechanism including
  - a striker received within the spindle that reciprocates along a reciprocation axis in response to the variable pressure air spring,
  - a piston that reciprocates along the reciprocation axis to induce the variable pressure air spring, and
  - a crankshaft configured to convert continuous rotational motion from the motor to reciprocating linear movement of the piston, the crankshaft defining a crank axis that is perpendicular to the reciprocation axis and the motor defines a motor axis that is parallel with the reciprocation axis; and
- a transmission that transfers rotation from the motor to the spindle, the transmission including an intermediate shaft having a first gear engaged with a second gear supported on the spindle to transfer rotation to the spindle, the intermediate shaft defining a rotational axis that is parallel with the crank axis;
- wherein a center of gravity of the impact power tool is positioned between the motor axis and the reciprocation axis; and
- wherein the center of gravity of the impact tool is positioned between the crank axis and the rotational axis.

2. The impact power tool of claim 1, wherein the motor axis is offset from the reciprocation axis.

3. The impact power tool of claim 1, wherein the housing includes a D-shaped handle.

4. The impact power tool of claim 1, wherein the reciprocating impact mechanism further includes a connecting rod connecting the piston to the crankshaft.

5. The impact power tool of claim 4, wherein the crankshaft includes an eccentric pin to which one end of the connecting rod is pivotably coupled.

6. The impact power tool of claim 1, wherein the motor includes an output shaft with a beveled pinion, and wherein the reciprocating impact mechanism further includes a bevel gear engaged with the beveled pinion.

7. The impact power tool of claim 6, wherein the bevel gear is concentric with the crank shaft for co-rotation therewith.

8. The impact power tool of claim 1, wherein the transmission further includes a third gear meshed with the first gear, the third gear coupled for co-rotation with a fourth gear that is meshed with a fifth gear supported by an output shaft of the motor.

9. The impact power tool of claim 1, further comprising a mode selection member rotatable to switch an operation of the impact power tool between a first mode, in which, the motor is drivably coupled to the piston for reciprocating the piston and rotating the spindle, a second mode, in which, the motor is decoupled from the piston but the spindle is rotated, and a third mode, in which, the motor is drivably coupled to the piston for reciprocating the piston but the spindle does not rotate.

10. An impact power tool adapted to impart axial impacts to a tool bit, the impact power tool comprising:

a housing;

a motor supported by the housing, the motor defining a motor axis;

a spindle coupled to the motor for receiving torque from the motor to cause the spindle to rotate;

a reciprocating impact mechanism that is operable to create a variable pressure air spring within the spindle, the impact mechanism including a piston that reciprocates along a reciprocation axis to induce the variable pressure air spring, and a crankshaft configured to convert continuous rotational motion from the motor to reciprocating linear movement of the piston, the crankshaft defining a crank axis that is perpendicular to the motor axis;

a transmission that transfers rotation from the motor to the spindle, the transmission including an intermediate shaft having a first gear engaged with a second gear supported on the spindle to transfer rotation to the spindle, the intermediate shaft defining a rotational axis that is parallel with the crank axis; and a mode selection member rotatable to switch an operation of the impact power tool between a first mode, in which, the motor is drivably coupled to the piston for reciprocating the piston and rotating the spindle, a second mode, in which, the motor is decoupled from the piston but the spindle is rotated, and a third mode, in which, the motor is drivably coupled to the piston for reciprocating the piston but the spindle does not rotate;

wherein a center of gravity of the impact tool is positioned between the crank axis and the rotational axis.

11. The impact power tool of claim 10, wherein the reciprocating impact mechanism further includes a striker received within the spindle that reciprocates along the reciprocation axis in response to the variable pressure air spring.

12. The impact power tool of claim 10, wherein the motor axis is parallel to the reciprocation axis.

13. The impact power tool of claim 12, wherein the motor axis is offset from the reciprocation axis.

14. The impact power tool of claim 10, wherein the transmission further includes a third gear meshed with the first gear, the third gear coupled for co-rotation with a fourth gear that is meshed with a fifth gear supported by an output shaft of the motor.

15. The impact power tool of claim 10, wherein the housing includes a D-shaped handle.

16. The impact power tool of claim 10, wherein the center of gravity is positioned between the motor axis and the reciprocation axis.

17. The impact power tool of claim 10, wherein the reciprocating impact mechanism further includes a connecting rod connecting the piston to the crankshaft.

18. The impact power tool of claim 17, wherein the crankshaft includes an eccentric pin to which one end of the connecting rod is pivotably coupled.

* * * * *